(12) United States Patent
Weng et al.

(10) Patent No.: US 7,574,615 B2
(45) Date of Patent: Aug. 11, 2009

(54) METHOD OF MANAGING POWER CONSUMPTION OF A NETWORK INTERFACE

(75) Inventors: Chih-Hsien Weng, Hsin-Tien (TW); Teng-Chuan Hsieh, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 417 days.

(21) Appl. No.: 10/842,891

(22) Filed: May 10, 2004

(65) Prior Publication Data

US 2005/0188232 A1    Aug. 25, 2005

(30) Foreign Application Priority Data

Feb. 24, 2004    (TW)    .............................. 93104542 A

(51) Int. Cl.
*G06F 1/32*    (2006.01)
(52) U.S. Cl. ...................................... 713/320
(58) Field of Classification Search ................. 713/320, 713/501
See application file for complete search history.

(56) References Cited

U.S. PATENT DOCUMENTS

| 6,546,496 | B1 * | 4/2003 | Wang et al. ................. 713/322 |
| 6,760,671 | B1 * | 7/2004 | Batcher et al. ................ 702/60 |
| 6,934,870 | B1 * | 8/2005 | Amos ......................... 713/501 |
| 6,963,985 | B2 * | 11/2005 | Stachura et al. ............. 713/310 |
| 7,117,377 | B2 * | 10/2006 | Hagiwara et al. ........... 713/300 |
| 2003/0167413 | A1 | 9/2003 | Stachura et al. ............ 713/300 |
| 2003/0226050 | A1 * | 12/2003 | Yik et al. .................... 713/324 |

FOREIGN PATENT DOCUMENTS

CN    1425232    6/2006

* cited by examiner

*Primary Examiner*—Thomas Lee
*Assistant Examiner*—Eric Chang
(74) *Attorney, Agent, or Firm*—J.C. Patents

(57) ABSTRACT

A method of managing power consumption of a network interface is provided. The method is capable of cutting off the power and the clock signal supply to the MAC and the PHY receiving terminals of the network interface when the user disables the wake-up function, and when the user enables the wake-up function, the power and the clock signal are supplied to the receiver of the medium access control unit and the receiver of the physical layer unit.

13 Claims, 4 Drawing Sheets

METHOD OF MANAGING POWER CONSUMPTION OF A NETWORK INTERFACE

CROSS-REFERENCE TO RELATED APPLICATION

This application claims the priority benefit of Taiwan application serial no. 93104542, filed on Feb. 24, 2004.

BACKGROUND OF THE INVENTION

1. Field of the Invention

This invention generally relates to a method of managing power consumption of a network interface, and more particularly to a method of managing power consumption of a network interface by controlling the power and the clock signal supply to the network interface according to enabling or disabling status of the wake-up function of the network interface.

2. Description of Related Art

As the network communication advances, most of the computer products provide the network communication function and usually also support the network wake-up function. Regardless of the kind of power management system used, when the computer product supports the wake-up function, at least some circuits have to be on standby in order to receive or respond the wake-up signal from the network. Because those circuits have been set, once the computer is turned on, the power will be supplied to those circuits. When the network wake-up function is not in use, these circuits still consume the power, which wastes the power resource.

FIG. 4 shows a flow chart of a method of switching the operation mode of the traditional network interface from the power-saving mode to the normal mode. In this traditional technology, when the network operates in the normal mode (S402), if the network is not in use for a predetermined period of time, the software will determine whether to enter the network interface into the power-saving mode (S404).

After the software determines to enter the network interface into the power-saving mode, the peripheral controller interface only provides the power and the clock signal to the medium access control (MAC) receiving terminal and the physical layer (PHY) receiving terminal (S406) for receiving the wake-up signal from the external source. The power and the clock signal will not be supplied to the MAC transmitting terminal and the PHY transmitting terminal. Then the power and the clock signal supply to the peripheral controller interface will be cut off (S408). Accordingly, the network interface is switched to the power-saving mode (S410).

When the network interface operates in the power-saving mode (S502), whether the user initiates the system or whether the system receives the network wake-up signal from the network (S504) is continuously determined. If so, the power and the clock signal will be supplied to the peripheral controller interface (S506) first. Then the peripheral controller interface, the MAC and the PHY (S508) are reset.

The resetting of the peripheral controller interface, the MAC and the PHY programs and initializes the network interface (S510). Accordingly, the network is switched to the normal mode (S512).

In light of the above, the traditional computer products with network wake-up function as shown in step S406 will provide the power and the clock signal to the MAC and the PHY in the power-saving mode even when the wake-up function is not in use, which induces some unnecessary power consumption.

SUMMARY OF THE INVENTION

The present invention is directed to a method of managing power consumption of a network interface such that unnecessary power consumption, for example, when the network interface with disabled wake-up function enters into the power-saving mode from the normal mode.

The present invention is directed to a method of managing power consumption of a network interface by controlling the power and the clock signal supply to the MAC and the PHY receiving terminals of the network interface according to the enable/disable status of the wake-up function.

According to an embodiment of the present invention, the method of managing power consumption of a network interface, suitable for a network interface with a disabled wake-up function, is adapted for switching from a normal mode to a power-saving mode. According to an embodiment of the present invention, the network interface comprises a medium access control receiving terminal, a medium access control transmitting terminal, a physical layer receiving terminal and a physical transmitting terminal. For switching the network interface from a normal mode to a power-saving mode, a power supply to the medium access control receiving terminal, the medium access control transmitting terminal, the physical layer receiving terminal and the physical transmitting terminal is cut off. A clock signal supply to the medium access control receiving terminal, the medium access control transmitting terminal, the physical layer receiving terminal and the physical transmitting terminal is cut off. Accordingly, the network interface is switched to the power-saving mode.

According to an embodiment of the present invention, for switching the network interface from a power-saving mode to a normal mode, a power and a clock signal are supplied to the peripheral controller interface and a reset signal is sent to the peripheral controller interface. In response thereto, the network interface is programmed and initialized. Accordingly, the network interface is switched to the normal mode.

According to an embodiment of the present invention, when the user disables the wake-up function, a power supply to the medium access control receiving terminal, the medium access control transmitting terminal, the physical layer receiving terminal and the physical transmitting terminal is cut off; and a clock signal supply to the medium access control receiving terminal, the medium access control transmitting terminal, the physical layer receiving terminal and the physical transmitting terminal is cut off. Accordingly, the network interface is switched to the power-saving mode.

According to an embodiment of the present invention, the power and the clock signal supply to the MAC and the PHY receiving terminals of the network interface are controlled such that when the wake-up function is disabled, the power and the clock signal supply to network interface are cut off and thereby the network interface is switched to the power-saving mode, and therefore unnecessary power and clock signal consumption is effectively reduced.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE EMBODIMENTS

Figure 1:
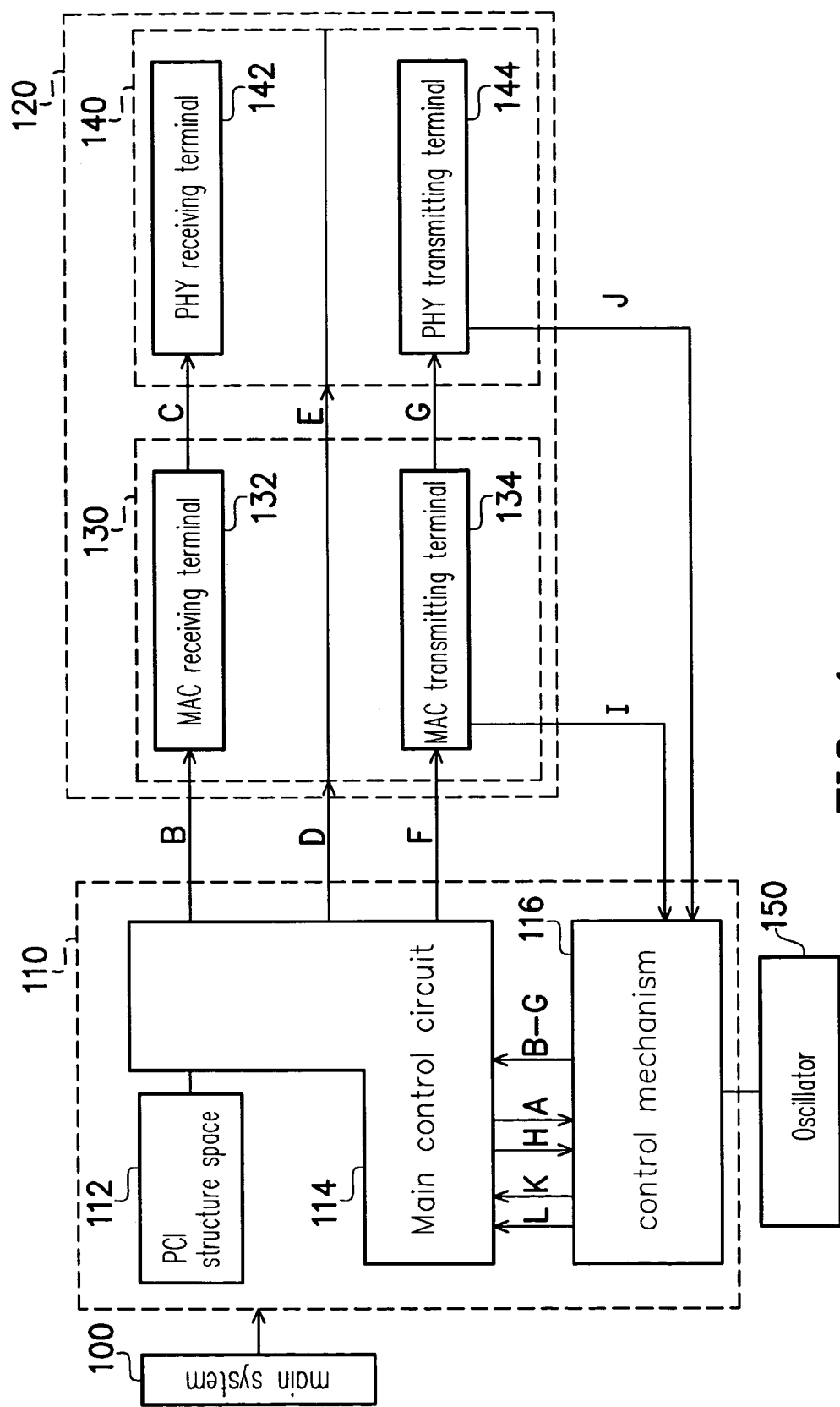
FIG. 1 is a block diagram relating to a method of managing power consumption of a network interface in accordance with an embodiment of the present invention.

FIG. 1 is a block diagram illustrating a method of managing power consumption of a network interface in accordance with an embodiment of the present invention. Referring to FIG. 1, the network interface, according to an embodiment of the present invention, comprises a main system 100, a peripheral controller interface (PCI) 110 and a network interface 120. The PCI 110 couples the main system 100 with the network interface 120.

In an embodiment of the present invention, the PCI 110 comprises a PCI structure space 112, a main control circuit 114 and a control mechanism 116. The clock signal of the control mechanism 116 is provided by an independent oscillator 150 and is not controlled by the main control circuit 114.

In an embodiment of the present invention, the network interface 120 comprises a MAC 130 and a PHY 140. The MAC 130 comprises the MAC receiving terminal 132 for receiving the data from the network and the MAC transmitting terminal 134 for transmitting the data to the network. Likewise, the PHY 140 comprises the PHY receiving terminal 142 for receiving the data from the network and the PHY transmitting terminal 144 for transmitting the data to the network.

In an embodiment of the present invention, the MAC receiving terminal 132, the MAC transmitting terminal 134, the PHY receiving terminal 142 and the PHY transmitting terminal 144 are controlled by the control mechanism 116.

In an embodiment of the present invention, the labels A-L represent different signals. Signal A indicates whether to enable the wake-up function. Signal B provides the clock signal to the MAC receiving terminal 132, the MAC transmitting terminal 134. Signal C provides the clock signal to the PHY receiving terminal 142 and the PHY transmitting terminal 144. Signal D informs the MAC receiving terminal 132 and the MAC transmitting terminal 134 that the power will be turned off. Signal E informs the PHY receiving terminal 142 and the PHY transmitting terminal 144 that the power will be turned off. Signal F resets the MAC receiving terminal 132 and the MAC transmitting terminal 134. Signal G resets the PHY receiving terminal 142 and the PHY transmitting terminal 144. Signal H indicates that the main system commands the control mechanism to move network interface into the power-saving mode. Signal I indicates that the clock signal for the MAC receiving terminal 132 and the MAC transmitting terminal 134 can be turned off. Signal J indicates that the clock signal for the PHY receiving terminal 142 and the PHY transmitting terminal 144 can be turned off. Signal K means that the control mechanism informs the main system to stop providing the clock signal to the MAC and the PHY. Signal L means that the control mechanism informs the main system that the MAC and the PHY have entered into the normal mode.

Figure 2:
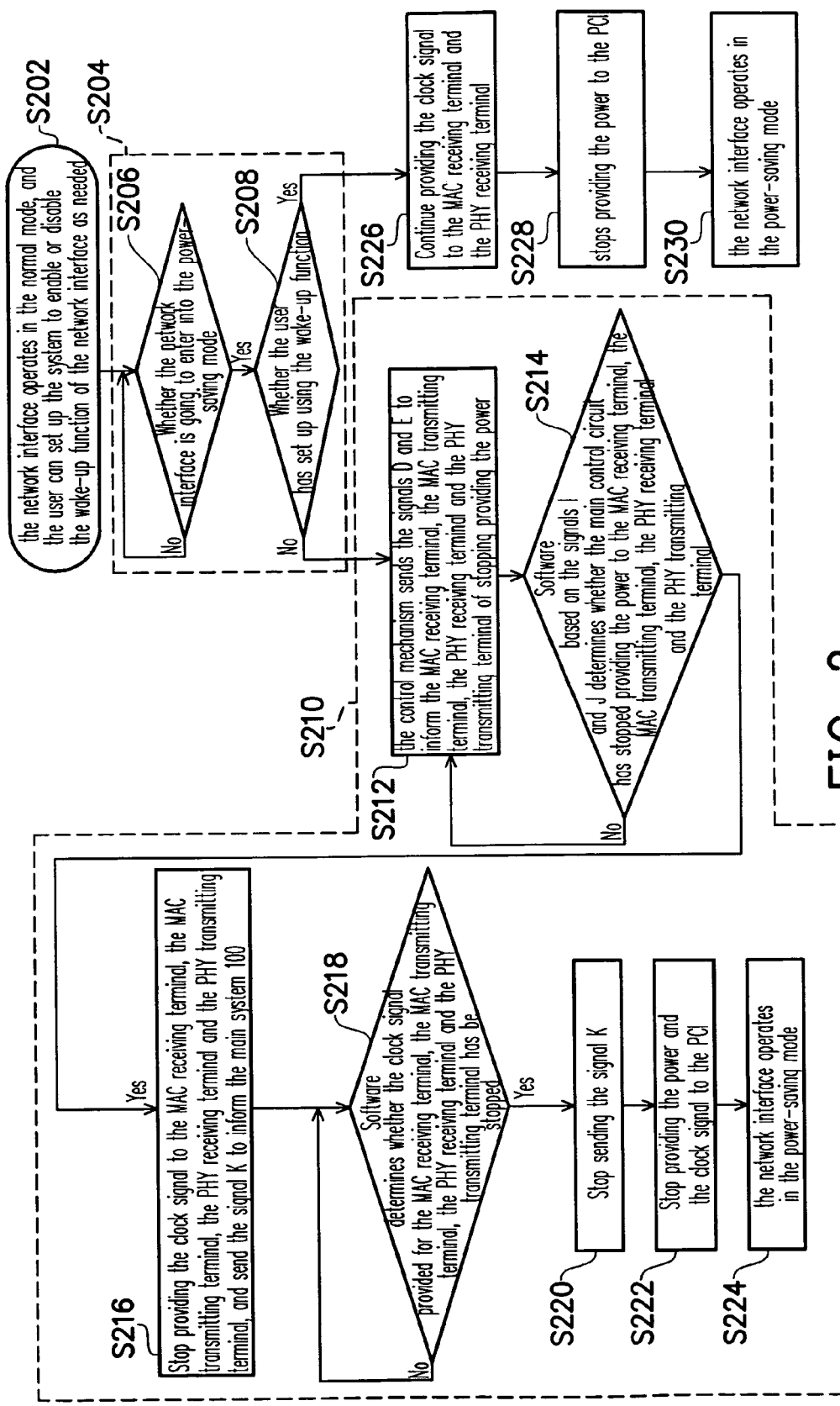
FIG. 2 shows a flow chart illustrating a method of managing power consumption of a network interface in accordance with an embodiment of the present invention.

FIG. 2 shows a flow chart of a method of managing power consumption of a network interface in accordance with an embodiment of the present invention. The flow chart shown in FIG. 2 illustrates the method of switching the network interface into the power-saving mode from the normal mode.

In an embodiment of the present invention, when the network interface 120 operates in the normal mode, the user can set up the system to enable or disable the wake-up function of the network interface 120 as needed (S202). One skilled in the art can easily understand that the network interface 120 can enter into the power-saving mode, for example, but not limited to, immediately after the user commands the system to enter into power-saving mode, after the network interface 120 is not in use for a predetermined period of time, or after some requirements have been met by the system.

When the user has enabled the wake-up function (S204), the network interface 120 enters into the power-saving mode whether. Next, whether the network interface 120 is entering into the power-saving mode (S206) is determined. If so, whether the user has set up the wake-up function (S208) then determined. The control mechanism 116 will determine whether the user has enabled the wake-up function based on the signal A from the main control circuit 114.

When the control mechanism 116 determines that the user disabled the wake-up function, the main control circuit 114 cuts off the power and the clock signal supply to the MAC receiving terminal 132, the MAC transmitting terminal 134, the PHY receiving terminal 142 and the PHY transmitting terminal 144 (S210).

In an embodiment of the present invention, in step S210, the control mechanism 116 sends the signals D and E to inform the MAC receiving terminal 132, the MAC transmitting terminal 134, the PHY receiving terminal 142 and the PHY transmitting terminal 144 to cut off the power (S212) supply. Then the software determines whether the main control circuit 114 has cut off the power supply to the MAC receiving terminal 132, the MAC transmitting terminal 134, the PHY receiving terminal 142 and the PHY transmitting terminal 144 (S214) according to the signals I and J.

After ensuring that the main control circuit 114 has cut off the power supply, the control mechanism 116 sends the signals B and C to the main control circuit 114 to cut off the clock signal supply to the MAC receiving terminal 132, the MAC transmitting terminal 134, the PHY receiving terminal 142 and the PHY transmitting terminal 144, and sends the signal K to inform the main system 100 (S216). Then the software determines whether the clock signal supply to the MAC receiving terminal 132, the MAC transmitting terminal 134, the PHY receiving terminal 142 and the PHY transmitting terminal 144 has been cut off (S218). After ensuring that the clock signal has been cut off, the control mechanism 116 stops sending the signal K (S220).

In an embodiment of the present invention, when the power and the clock signal supply to the MAC 130 and the PHY 140 are cut off, the main system 110 stops supplying the power and the clock signal to the PCI 110 (S222). Accordingly, the network interface 120 is switched to the power-saving mode (S224).

Of course, in this embodiment of the present invention, when the clock signal and the power supply to one of the MAC receiving terminal 132, the MAC transmitting terminal 134, the PHY receiving terminal 142 and the PHY transmitting terminal 144 are cut off, it would be better to make sure that all data in the MAC 130 and the PHY 140 are transmitted to avoid any data loss.

In step S208, when the user enables the wake-up function, the main control circuit 114 begins to supply the clock signal to the MAC receiving terminal 132 and the PHY receiving terminal 142 (S226), but stops supplying the power to the PCI 110 (S228). At this time, the network interface 120 operates in the power-saving mode (S230). When the user enables the wake-up function at the time the network interface 120 is entering from the power-saving mode into the normal mode, the method or the steps are similar to that of the prior art.

Figure 3:
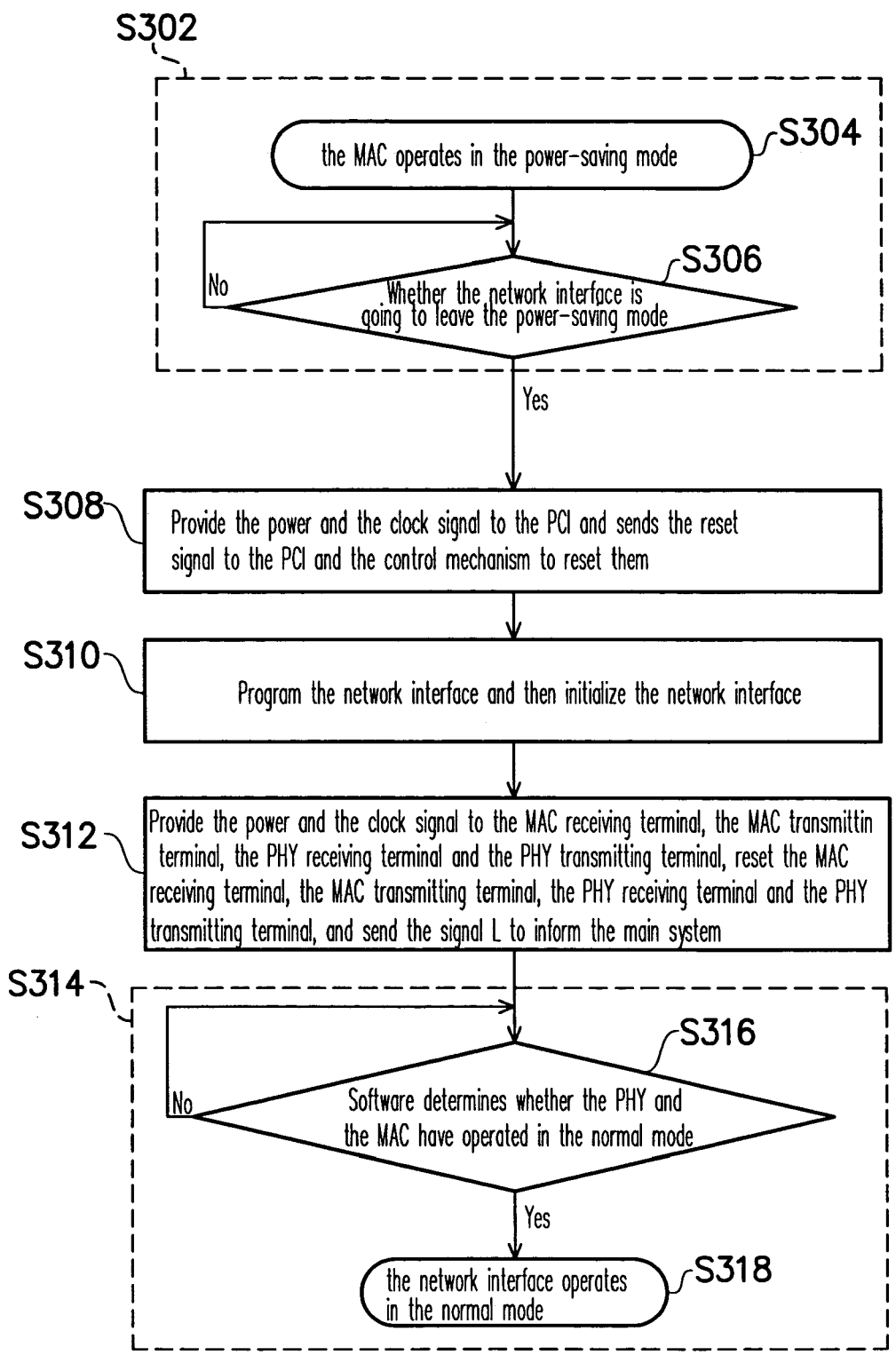
FIG. 3 shows a flow chart illustrating a method of switching the operation mode of a network interface from a power-saving mode to a normal mode in accordance with an embodiment of the present invention.
Figure 4:
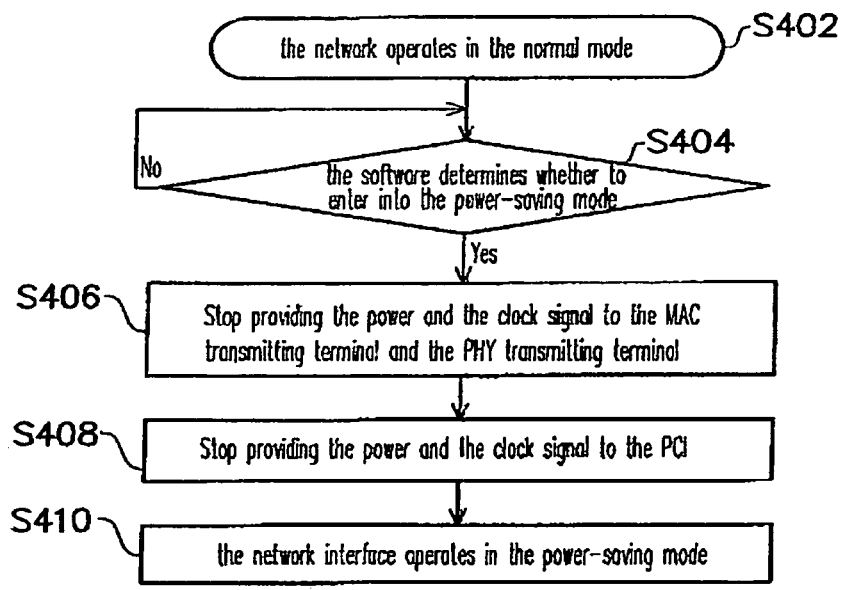
FIG. 4 shows a flow chart of a method of switching an operation mode of a traditional network interface from a normal mode to a power-saving mode.
Figure 5:
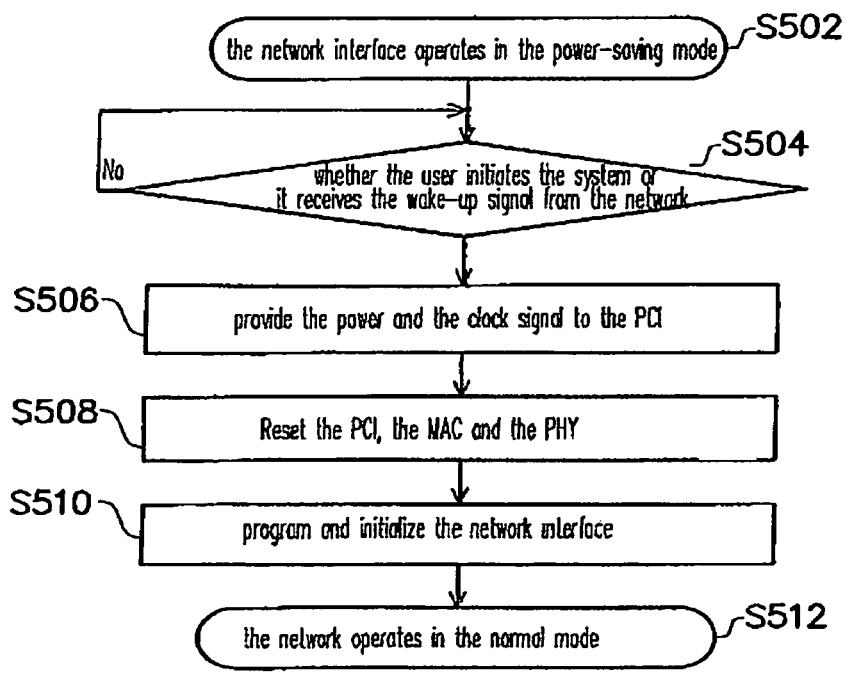
FIG. 5 shows a flow chart of a method of switching an operation mode of a traditional network interface from a power-saving mode to a normal mode.

FIG. 3 is a flow chart illustrating a method of switching the network interface 120 from a power-saving mode to a normal mode (S302). First, the MAC in the power-saving mode (S304) continuously determines whether the network interface 120 is initialized to leave the power-saving mode (S306). For example but not limited to, a method to determine whether the network interface 120 is initialized to leave the power-saving mode is based on whether the user turns on the system or whether a predetermined period time set by the main system has been reached.

First the power and the clock signal are supplied to the PCI 114 and the reset signal is sent to the PCI 114 and the control mechanism 116 to reset PCI 114 and the control mechanism 116 (S308). Next, the main system sends the signal H to command the control mechanism 116 to switch the network interface 120 from the power-saving mode to the normal mode. Hence, before the network interface 120 enters into the normal mode, the control mechanism 116 will program the network interface 120 and then initializes the network interface 120 (S310).

In an embodiment of the present invention, after programming and initializing the network interface 120, the control mechanism 116 controls the main control circuit 114 to provide the power and the clock signal to the MAC receiving terminal 132, the MAC transmitting terminal 134, the PHY receiving terminal 142 and the PHY transmitting terminal 144, and sends the signals F and G to reset the MAC receiving terminal 132, the MAC transmitting terminal 134, the PHY receiving terminal 142 and the PHY transmitting terminal 144. Further, the control mechanism 116 also sends the signal L to inform the main system 100 (S312).

After providing the power and the clock signal to the MAC receiving terminal 132, the MAC transmitting terminal 134, the PHY receiving terminal 142 and the PHY transmitting terminal 144, the network interface 120 enters into the normal mode (S314). In step S314, the software determines whether the PHY 140 and the MAC 130 are in the normal mode (S316). If so, the network interface is also entered into the normal mode (S318).

In an embodiment of the present invention, the wake-up function can be, for example but not limited to, a network wake-up function.

FIG. 1 can also used to describe a network apparatus according to another embodiment of the present invention. The network apparatus at least comprises the network interface 120 and the PCI 110. The network interface 120 comprises the MAC receiving terminal 132, the MAC transmitting terminal 134, the PHY receiving terminal 142 and the PHY transmitting terminal 144. The PCI 110 is coupled to the network interface 120 and the main system 100, and the PCI 110 comprises a main control circuit 114 and a control mechanism 116 to control (turn on/off) the MAC receiving terminal 132, the MAC transmitting terminal 134, the PHY receiving terminal 142 and the PHY transmitting terminal 144. Here, the PCI structure space 112 is irrelevant to this embodiment and thus will not be described hereinafter.

The control mechanism 116 can control the clock signal of the MAC receiving terminal 132, the MAC transmitting terminal 134, the PHY receiving terminal 142 and the PHY transmitting terminal 144. To effectively coordinate the clock signal and the signal form the main system 100, according to this embodiment, the control mechanism 116 can control the clock signal to the MAC receiving terminal 132, the MAC transmitting terminal 134, the PHY receiving terminal 142 and the PHY transmitting terminal 144 via the main control circuit 114.

The control mechanism 116 coupled to the oscillator 150 obtains the first clock signal from the oscillator 150 and provides it to the network interface 120. The first clock signal is independent from the second clock signal provided by the main system 100 for the network interface 120. The control mechanism 116 can send the first clock signal to the network interface 120 by at least one of the following channels: (a) the control mechanism 116 directly sends the first clock signal from the oscillator 150 to the network interface 120; and (b) the control mechanism 116 sends the first clock signal from the oscillator 150 to the network interface 120 via the main control circuit 114.

One of the major characteristics of the present invention is to use the control mechanism 116 to control the clock signal obtained by the network interface 120. In the prior art, because the need of the network wake-up function, there are always some devices of the network interface 120 on standby, the clock signal directly (from the source such as oscillator) enters into the network interface 120. This embodiment of the present invention uses the control mechanism 116 to control the clock signal entering into the network interface 120. Hence, any clock signal can be prevented from entering into the network interface 120 in order to reduce the power consumption of the network interface 120 due to the clock signal.

Generally, compared to the MAC receiving terminal 132, the MAC transmitting terminal 134, the PHY receiving terminal 142 and the PHY transmitting terminal 144, which operate according to the first clock signal, the PCI operates according to the second clock signal.

In light of the above, the method of managing power consumption of a network interface of the present invention has at least the following advantages:

1. The circuits of the network wake-up function can be selectively turned off so as to reduce the power consumption.

2. The circuits of the network wake-up function can be selectively turned on when the network wake-up function is needed.

3. The method of the present invention is suitable for all devices with the network wake-up function capability, especially for the electronics devices such as notebook computers whose power is provided by the battery, where reduction of the power consumption is highly desirable so as to prolong the operation time.

4. The method of the present invention is also suitable for the computers or peripheral devices in which the network wake-up function is not required.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A method for managing power consumption of a network interface with a disabled wake-up function, said network interface including a medium access control (MAC) and a physical layer (PHY), the MAC comprising a MAC receiving terminal and a MAC transmitting terminal, the PHY comprising a PHY receiving terminal and a PHY transmitting terminal, said network interface being coupled to a main system via a peripheral controller interface (PCI), said method comprising:
cutting off a power and a clock signal supplied to said MAC receiving terminal, said MAC transmitting terminal, said PHY receiving terminal, and said PHY transmitting terminal via a main control circuit of the PCI when the network interface is switched from a normal mode to a power saving mode; and
cutting off the power and the clock signal supplied to the PCI via the main system after the power and the clock signal supplied to the MAC receiving terminal, the MAC transmitting terminal, the PHY receiving terminal and the PHY transmitting terminal are cut off;
wherein said MAC receiving terminal, said MAC transmitting terminal, said PHY receiving terminal, and said PHY transmitting terminal are controlled by a control mechanism of said PCI, the clock signal obtained by the network interface is also controlled by the control mechanism of said PCI, and when the power and the clock signal are cut off to said MAC receiving terminal, said MAC transmitting terminal, said PHY receiving terminal and said PHY transmitting terminal, the entire logic of the MAC and the PHY being placed in idle.

2. The method of claim 1, wherein said control mechanism is operated by a first clock signal that is independent from a second clock signal provided by said main system to said network interface.

3. The method of claim 2, wherein said MAC receiving terminal, said MAC transmitting terminal, said PHY receiving terminal and said PHY transmitting terminal are operated by said first clock signal.

4. The method of claim 2, wherein said PCI is operated by said second clock signal.

5. The method of claim 1, further comprising:
providing the power and the clock signal to said PCI and sending a reset signal to reset said PCI and the control mechanism via the main system when the network interface is switched from the power saving mode to the normal mode;
programming and initializing said network interface; and
providing said power and said clock signal to said MAC receiving terminal, said MAC transmitting terminal, said PHY receiving terminal and said PHY transmitting terminal and resetting the MAC receiving terminal, the MAC transmitting terminal, the PHY receiving terminal and the PHY transmitting terminal via the main control circuit.

6. The method of claim 5, further comprising: notifying said main system via the control mechanism when said MAC receiving terminal, said MAC transmitting terminal, said PHY receiving terminal and said PHY transmitting terminal have operated in said normal mode.

7. A network apparatus comprising:
a network interface with a disable wake-up function, including a medium access control (MAC) and a physical layer (PHY), the MAC comprising a MAC receiving terminal and a MAC transmitting terminal, and the PHY comprising a PHY receiving terminal and a PHY transmitting terminal; and
a peripheral controller interface (PCI), coupled to said network interface and a main system, said PCI including a main control circuit and a control mechanism, said MAC receiving terminal, said MAC transmitting terminal, said PHY receiving terminal and said PHY transmitting terminal being controlled by the control mechanism;
wherein when the network interface is switched from a normal mode to a power saving mode, the main control circuit cuts off a power and a clock signal to the MAC receiving terminal, the MAC transmitting terminal, the PHY receiving terminal and the PHY transmitting terminal, and the clock signal obtained by the network interface is controlled by the control mechanism;
after the power and the clock signal supplied to the MAC receiving terminal, the MAC transmitting terminal, the PHY receiving terminal and the PHY transmitting terminal are cut off, the main system cuts off the power and the clock signal to the PCI; and
when the power and the clock signal are cut off to said MAC receiving terminal, said MAC transmitting terminal, said PHY receiving terminal and said PHY transmitting terminal, the entire logic of the MAC and the PHY being placed in idle.

8. The network apparatus of claim 7, wherein said control mechanism is coupled to an oscillator, said oscillator provides a first clock signal to said control mechanism, and said first clock signal is independent from a second clock signal provided by said main system to said PCI.

9. The network apparatus of claim 8, wherein said control mechanism sends said first clock signal to said network interface by using at least one of the following path:
said control mechanism directly sending said first clock signal from said oscillator to said network interface; and
said control mechanism sending said first clock signal from said oscillator to said network interface via said main control circuit.

10. The network apparatus of claim 8, wherein said MAC receiving terminal, said MAC transmitting terminal, said PHY receiving terminal, and said PHY transmitting terminal are operated by said first clock signal.

11. The network apparatus of claim 8, wherein said PCI is operated by said second clock signal.

12. The network apparatus of claim 7, wherein when the network interface is switched from the power saving mode to the normal mode, the main system provides the power and the clock signal to the PCI and sends a reset signal to reset the PCI and the control mechanism and then programs and initializes the network interface so as to provide the power and the clock signal to the MAC receiving terminal, the MAC transmitting terminal, the PHY receiving terminal and the PHY transmitting terminal and reset the MAC receiving terminal, the MAC transmitting terminal, the PHY receiving terminal and the PHY transmitting terminal via the main control circuit.

13. The network apparatus of claim 12, wherein when the MAC receiving terminal, the MAC transmitting terminal, the PHY receiving terminal and the PHY transmitting terminal have operated in said normal mode, the control mechanism notifies the main system.

* * * * *